Figure 1:
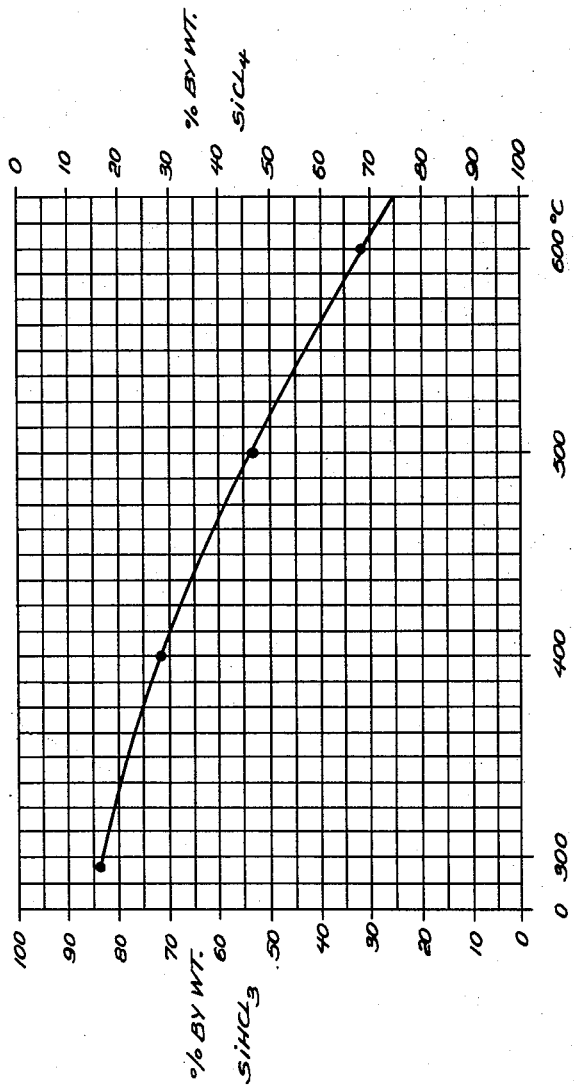

INVENTORS
EDUARD ENK,
JULIUS NICKL,
HORST TEICH,

INVENTORS
EDUARD ENK,
JULIUS NICKL,
HORST TEICH,
BY Bailey, Stephens & Huettig
ATTORNEYS

3,148,035
APPARATUS FOR THE CONTINUOUS PRODUCTION OF SILICON CHLOROFORM AND/OR SILICON TETRACHLORIDE
Eduard Enk, Julius Nickl, and Horst Teich, Burghausen, Upper Bavaria, Germany, assignors to Wacker-Chemie G.m.b.H., Munich, Germany
Filed Mar. 2, 1961, Ser. No. 92,798
Claims priority, application Germany Mar. 10, 1960
1 Claim. (Cl. 23—284)

The present invention relates to an improved process for the production of silicon chloroform (trichlorosilane) and/or silicon tetrachloride.

Silicon tetrachloride is formed when a mixture of quartz and carbon containing materials are reacted with chlorine at red heat.

It is furthermore known that granular silicon which may be diluted with an extending agent can be reacted with chlorine in a fluidized bed (published German application 1,048,892) whereby silicon tetrachloride is again produced. Other metallic silicon containing materials, such as, for example, the residues obtained in the production of silicon carbide (published German application 1,036,234) can be used as starting materials in such fluidized bed process instead of silicon.

It is furthermore known that silicon chloroform can be produced from silicon and hydrogen chloride.

These known processes, however, do not render it possible to produce silicon tetrachloride and silicon chloroform simultaneously in a desired ratio, as the reaction between silicon and chlorine always forms silicon tetrachloride and no silicon chloroform.

It is often desirable in chemical industry to be able to render hydrogen chloride which often occurs as a waste product useful and to use it instead of chlorine. In addition, it is of advantage in the production of semiconductor silicon to use mixtures of silicon chloroform and silicon tetrachloride as starting materials.

According to the invention a process was found for the continuous production of silicon chloroform and/or silicon tetrachloride (in a fluidized bed) by conversion of metallic silicon and/or metallic silicon containing materials at temperatures between 260 and 1200° C. in a fluidized bed with hydrogen chloride supplied through a distributing bottom plate. The process is characterized in that a conical insert is provided centrally within the fluidized bed with its base just above the distributing gas supply plate. The conical insert can, if necessary, be employed as a cooling surface. At the same time the materials not taking place in the reaction and solid reaction products are continuously withdrawn from below the base of the conical insert.

By regulating and providing a suitable reaction temperature, if necessary with the use of cooling liquids which do not form an explosive mixture with the reaction product, a certain silicon tetrachloride-silicon chloroform ratio is provided in the reaction mixture. The reaction products produced in this manner only contain traces of higher silicon chlorides, such as $Si_2Cl_6$ and $Si_3Cl_8$, and the chloride mixture produced can be processed directly in gaseous or condensed form.

Figure 2:
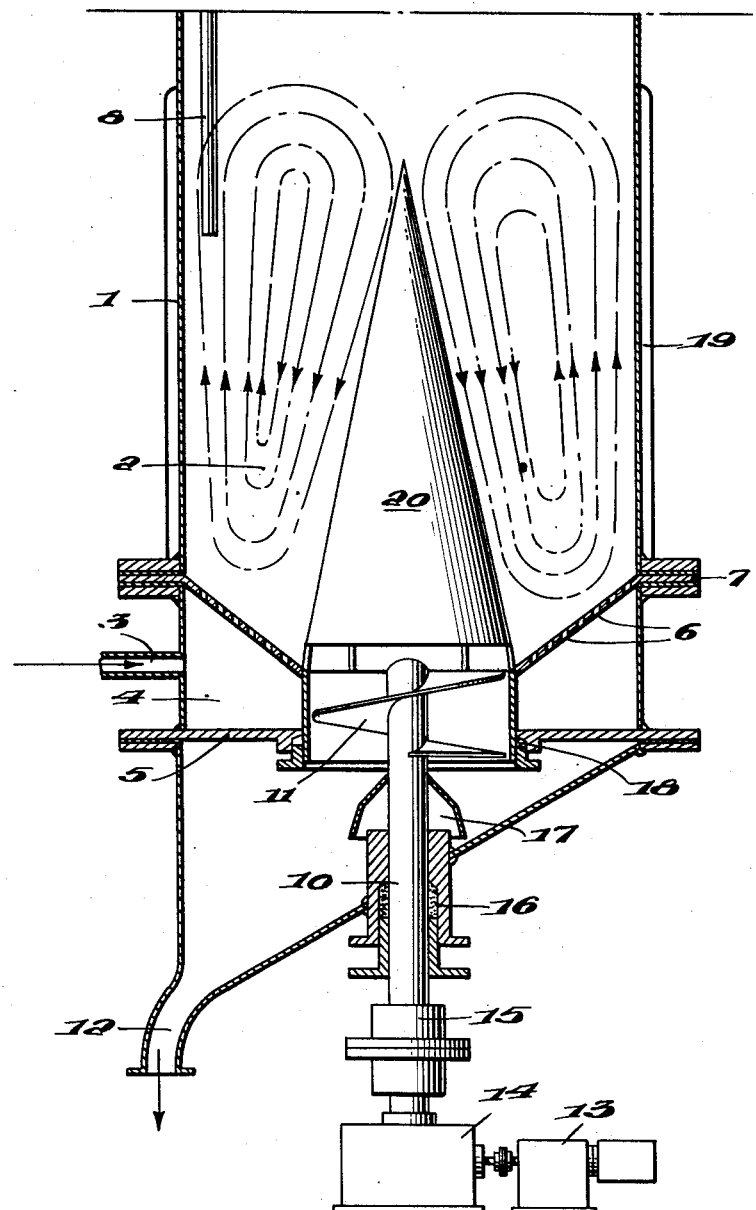

In the accompanying drawings:

FIG. 1 is a graph showing the relationship between the reaction temperature and the composition of the reaction mixture; and FIG. 2 shows a sectional view of an apparatus suitable for carrying out the process according to the invention.

FIG. 1 shows the results obtained at various reaction temperatures using technically pure silicon and water free hydrogen chloride as starting materials. It is clearly seen that with rising temperatures the silicon chloroform content in the reaction product decreases in a definite manner and that at 700° C. practically only silicon tetrachloride would be produced. On the other hand, at an operating temperature of 300° C. about 83% of silicon chloroform is contained in the reaction product. It is therefore possible through more or less strong cooling of the reaction mass to provide the desired reaction temperature and thereby determine the composition of the end product. The silicon tetrachloride content of the reaction product increases with increasing reaction temperature while the silicon chloroform content decreases irregardless of the type and composition of the silicon employed as a starting material.

The purity of the starting materials also influences the composition of the reaction product. The purer the silicon employed the greater the silicon chloroform content in the reaction product, the other conditions being the same. For example, at 500° C. one obtains a reaction mixture containing 50% by weight of silicon chloroform when technically pure silicon containing 2-3% by weight of impurities is employed as a starting material. However, when a silicon is used whose total impurities is only 0.1% by weight, the other conditions being the same, the silicon chloroform content rises to 70% by weight. When so-called semiconductor silicon is used practically pure silicon chloroform containing less than 5% by weight of silicon tetrachloride is produced at 500° C.

With increasing purity of the silicon used as the starting material, the initiation of the reaction is displaced towards higher temperatures. For example, extremely pure silicon usually only reacts at a temperature of 500° C. whereas technically pure silicon containing one or more percent by weight of impurities will already react at temperatures below 300° C., for example, at 280° C.

This inhibition of the reaction by silicon of high purity can, however, be easily eliminated by providing for surface impurities, for example, by applying metals or metal or non-metal compounds, for example, copper, silver nitrate, iron chloride, phosphorus chloride and the like, to the surface of the silicon. These materials can be applied in solid form or as a liquid or be sprayed on in the form of a solution and dried on. With metals it suffices merely to bring the silicon into close contact therewith, for example, by allowing the silicon to roll over a corresponding metal plate. It is surprising that extraordinarily small quantities of the named impurities which can lie at the lower limit of detection by spectroanalysis will reduce the ignition temperature (temperature at which the reaction initiates). It furthermore is interesting that the intentionally added substances are not consumed during the reaction with the hydrogen chloride or that once the reaction has initiated it is not disturbed when the original surface of the silicon introduced has long since been consumed.

It furthermore is advantageous if the silicon being converted rests on a support, such as a plate, ring or the like, provided with perforations through which the gaseous hydrogen chloride is blown into the silicon from below. The perforated plate or the like serving for introduction of the hydrogen chloride stream may at the same time be provided at its center with an arrangement, such as a screw conveyor, through which the solids not taking part in the reaction and the solid reacted products can be removed from the fluidized bed. A continuous operation can be carried out in such a reaction vessel if fresh granular silicon or granular starting material containing elemental silicon is continuously replenished from above and the residues are continuously removed from above the perforated plate or the like. With the arrangement described, bogging down of the fluidized bed as might be feared does not occur. The term "bogging down" is employed to signify that the residues take up the volume of the actual fluidized bed and thereby disturb the reaction.

The process according to the invention is also adapted for the conversion of residues, which occur in the production of silicon carbide, to silicon tetrachloride, silicon chloroform or definite mixtures of both with the aid of hydrogen chloride. In this case, the residues of the reaction consisting of carbon, silicon carbide and slags are withdrawn from the reaction vessel. Other impurities or admixtures with the silicon employed, such as when silicon silver or silicon copper alloys are employed, can be withdrawn in a similar manner. Even ferrosilicon poor in silicon can be processed continuously in the process according to the invention.

FIG. 2 in the drawing illustrates by way of example an apparatus which is suitable for continuous operation.

The fluidized bed 2 of elemental silicon containing material is maintained in cylindrical container 1 above annular plate shaped perforated bottom 7 by the hydrogen chloride streaming upwardly through perforations 6. The hydrogen chloride which is introduced through inlet 3 is supplied to the bottom of perforated plate 7 above chamber 4 which is closed at the bottom by bottom plate 5. A cone 20 is supported above the central opening in annular perforated plate 7 in such a way as to provide lateral access of material from above said perforated plate to said central opening. The gases produced in the reaction are withdrawn from above the fluidized bed. New granular silicon containing material is supplied to the fluidized bed from above over conduit 8. The unconsumed solid residues or solid reaction products produced during the reaction which accumulate over perforated bottom 7 are supplied to screw conveyor 11 located in the central opening of plate 7 below cone 20 and are removed from the apparatus over outlet 12.

Cone 20 is supported centrally within tube 1 so as to provide flow of the material in the fluidized bed as is depicted in FIG. 2. Cone 20 can be used simultaneously as a cooling surface.

Shaft 10 which is provided to drive screw conveyor 11 is driven in a known manner by motor 13, gearing 14 and clutch 15. Stuffing box 16 is protected against fouling by shield 17. Perforated plate 7 is fastened to bottom plate 5 over stuffing box 18. The excess heat of reaction is removed by cooling jacket 19 or by rib or coil coolers arranged within the space of the fluidized bed.

The slope of perforated plate 7 depends upon the type and quantity of the residues concerned. The greater the quantity of residues per unit of time the greater the slope.

The following example is illustrative of the process according to the invention.

*Example*

Granulated, technically pure silicon having a granular size of from 0.1 to 0.36 mm. was used as starting material. This grain mixture may contain up to 15% by weight of proportions smaller than 0.1 mm.

Contrary to expectation it was noted that the fluidized bed consisting of grains within the range of size mentioned above stores dustlike particles.

The technical silicon employed contained 0.1 to 0.5% by weight of slags and 1 to 3% by weight of metallic impurities which were not converted during reaction.

The grain mixture was reacted with dry hydrogen chloride at 300° C. on an annular plate shaped perforated bottom according to FIG. 2, each of the perforations having a diameter of 0.7 mm. The total diameter of the fluidized bed in the cylindrical container is 300 mm. The fluidized bed has a height of about 500 mm. and requires 8 to 10 c.b.m. hydrogen chloride (760 mm. Hg at 20° C.) per hour. The temperature of the fluidized bed was kept at 290–310° C. by circulating water and silicon tetrachloride and thereby cooling the exterior jacket 1. The temperature was measured by known means, such as thermo couples projecting into the fluidized bed at various points. The unreacted slags and metallic impurities preferably gather below cone 20 and were discharged through screw conveyor 11 at 12 to 24 turns per day. New, well dried silicon was introduced over inlet conduit 8 to the fluidized bed.

In this way, silicon chloroform containing 17% by weight of silicon tetrachloride was obtained.

We claim:

An apparatus for the continuous production of at least one silicon halide selected from the group consisting of silicon tetrachloride and silicon chloroform from granular metallic silicon containing material and hydrogen chloride comprising a cylindrical reaction vessel, a perforated annular bottom plate within said reaction vessel having a centrally located opening therein, said perforated annular plate sloping downwardly toward the centrally located opening therein, a conical insert centrally located within said reaction vessel with its base directed downwardly, said conical insert being supported above the central opening in the annular perforated plate so as to permit access of solid material above the perforated plate to said central opening, an annular chamber located below said perforated annular plate communicating with the perforations in the perforated plate but out of communication with said central opening, means for supplying hydrogen chloride to said annular chamber and upwardly through the perforations in said annular plate communicating therewith, means for supplying granular metallic silicon containing material to the reaction vessel above said annular perforated plate, means above the perforated plate for withdrawing gaseous reaction products from said reaction vessel and screw conveyor means concentrically located in said centrally located opening below said conical insert for withdrawing solid material from above said perforated annular plate through the centrally located opening located below the conical insert.

References Cited in the file of this patent

UNITED STATES PATENTS

| 2,429,751 | Gohr et al. | Oct. 28, 1947 |
| 2,777,760 | Dineen et al. | Jan. 15, 1957 |

FOREIGN PATENTS

| 504,581 | Canada | July 27, 1954 |